United States Patent

Ma

(12) United States Patent
(10) Patent No.: US 6,521,715 B1
(45) Date of Patent: Feb. 18, 2003

(54) GRAFT COPOLYMER PIGMENT DISPERSANTS

(75) Inventor: Sheau-Hwa Ma, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 7 days.

(21) Appl. No.: 09/643,701

(22) Filed: Aug. 22, 2000

(51) Int. Cl.$^7$ ............................. C08F 8/32; C08F 116/36
(52) U.S. Cl. .................... 525/379; 525/328.6; 525/293; 525/350; 525/279; 525/382; 524/504; 524/555; 524/560
(58) Field of Search ................................ 525/102, 293, 525/328.6, 350, 379, 380, 282, 279, 382; 524/504, 560, 555

(56) References Cited

U.S. PATENT DOCUMENTS

| | | | |
|---|---|---|---|
| 4,680,352 A | | 7/1987 | Janowicz et al. ............ 526/147 |
| 4,722,984 A | | 2/1988 | Janowicz .................... 526/123 |
| 5,085,698 A | * | 2/1992 | Ma et al. .................... 524/388 |
| 5,187,229 A | | 2/1993 | Yamamoto et al. ......... 525/123 |
| 5,219,945 A | * | 6/1993 | Dicker et al. ............... 525/271 |
| 5,272,201 A | * | 12/1993 | Ma et al. .................... 524/505 |
| 5,278,225 A | | 1/1994 | Kohlhammer et al. ...... 524/560 |
| 5,358,566 A | * | 10/1994 | Tanaka et al. .............. 106/808 |
| 5,414,041 A | | 5/1995 | Larson et al. ............... 524/589 |
| 5,418,277 A | * | 5/1995 | Ma et al. .................... 347/100 |
| 5,426,142 A | | 6/1995 | Rosano et al. .............. 524/156 |
| 5,428,107 A | | 6/1995 | Tysak et al. ................ 525/102 |
| 5,484,849 A | | 1/1996 | Bors et al. ................ 525/167.5 |
| 5,494,961 A | | 2/1996 | Lavoie et al. ............... 525/102 |
| 5,494,975 A | | 2/1996 | Lauoie et al. ............. 525/928.6 |
| 5,498,659 A | | 3/1996 | Esser ......................... 524/549 |
| 5,498,661 A | | 3/1996 | Hutter ........................ 524/753 |
| 5,502,113 A | | 3/1996 | Antonelli et al. ........... 525/287 |
| 5,525,662 A | | 6/1996 | Lavoie et al. ............... 524/558 |
| 5,530,070 A | | 6/1996 | Antonelli et al. ......... 525/330.4 |
| 5,548,024 A | | 8/1996 | Lavoie et al. ............... 525/102 |
| 5,559,192 A | | 9/1996 | Bors et al. .................. 525/300 |
| 5,605,722 A | | 2/1997 | Esser ......................... 427/388.4 |
| 5,605,952 A | | 2/1997 | Esser ......................... 524/522 |
| 5,605,953 A | | 2/1997 | Esser ......................... 524/522 |
| 5,609,965 A | | 3/1997 | Esser ......................... 428/522 |
| 5,616,764 A | | 4/1997 | Lavoie et al. ............... 556/482 |
| 5,672,379 A | | 9/1997 | Schall et al. ............... 427/137 |
| 5,847,028 A | * | 12/1998 | Iwase et al. ................ 523/414 |
| 5,852,123 A | | 12/1998 | Huybrechts ................. 525/282 |
| 5,861,188 A | | 1/1999 | Schall et al. ............... 427/137 |
| 6,037,414 A | * | 3/2000 | Simms et al. .............. 525/176 |
| 6,132,502 A | * | 10/2000 | Yatake ...................... 106/31.86 |
| 6,245,832 B1 | * | 6/2001 | Suzuki et al. .............. 523/160 |

FOREIGN PATENT DOCUMENTS

| | | |
|---|---|---|
| EP | 0 502 573 A1 | 9/1992 |
| EP | 634393 A1 | 1/1995 |
| EP | 0727450 A1 | 8/1996 |
| EP | 741126 A2 | 11/1996 |
| EP | 0 778 317 A2 | 6/1997 |
| FR | 2121057 | 9/1972 |
| JP | 05097945 A | 4/1993 |
| JP | 07053934 A2 | 2/1995 |
| JP | 09165490 A | 6/1997 |
| JP | 10025331 A | 1/1998 |
| JP | 10330690 A2 | 12/1998 |

\* cited by examiner

Primary Examiner—Tatyana Zalukaeva
(74) Attorney, Agent, or Firm—Steven C. Benjamin

(57) ABSTRACT

A polymer dispersant for pigments based on an acrylic graft copolymer wherein the graft copolymer has a weight average molecular weight of 3,000–100,000 and comprises a polymeric backbone and macromonomer side chains attached to the backbone, wherein (1) the polymeric backbone is formed of polymerized ethylenically unsaturated monomers and (2) the side chains are macromonomers that are attached to the backbone at a single terminal point and are formed from polymerized ethylenically unsaturated monomers and have a weight average molecular weight of about 1,000–30,000 wherein the graft copolymer contains about 2 to 70% by weight, based on the weight of the graft copolymer, of polymerized ethylenically unsaturated monomers containing acetoacetate groups that are polymerized into the backbone, side chains, or both, and the acetoacetate groups are reacted with a primary amine to form a pendant acetoacetyl amine group on the graft copolymer which serves as the pigment anchoring group. These materials are effective in dispersing and stabilizing a wide range of pigments in solvent based systems and are particularly useful in forming pigment dispersions that are used in a variety of solvent borne coating compositions for automobiles and trucks, where they provide improved efficiency of pigment use, lower paint viscosity, and reduced emission of volatile organic solvent.

22 Claims, No Drawings

GRAFT COPOLYMER PIGMENT DISPERSANTS

BACKGROUND OF THE INVENTION

This invention relates to polymeric pigment dispersants, more particularly, it relates to graft copolymer pigment dispersants having an acetoacetyl amine pigment anchoring group. These dispersants are easy to prepare and are useful in dispersing a wide variety of pigments.

Polymeric pigment dispersants which are effective for dispersing pigments in organic liquids are known in the art and are used to form pigment dispersions that are used in a variety of solvent borne coating compositions. Nowadays, such pigment dispersions are widely used, for example, in exterior solvent borne paints for automobiles and trucks.

Much of the past activity with polymeric dispersants has been with random copolymers, but these relatively inefficient materials are being replaced by structured pigment dispersants having AB block copolymer or graft structures. The graft copolymer dispersants that have been used in the past are described in, for example, Huybrechts U.S. Pat. No. 5,852,123 issued Dec. 22, 1998. Such graft copolymers include a polymeric backbone and macromonomer side chains grafted onto the backbone and have attached to either the macromonomer or backbone, a polar group known as a pigment anchoring group which is designed to adsorb on the surface of a pigment particle and so attach the copolymer dispersant to the pigment surface. There is still a need to improve the binding or anchoring of these dispersants to the pigment surfaces. Ineffective anchoring of the dispersant to a pigment particle surface is highly undesired, as it allows the pigment particles to come close enough together to flocculate and leads to pigment dispersions and ultimately paints of poor stability and rheology and reduced color strength.

Nowadays, many of the modern pigments are chemically or physically treated to incorporate functional groups on their surfaces to enhance their performance. This presents the possibility for enhancing the binding force of a polymeric dispersant to the pigment surfaces, since these functional groups can then become potential sites for anchoring the dispersant polymers onto their surfaces for improved dispersion stability and rheology. The commonly used surface treating agents are pigment derivatives having acidic groups such as sulfonates and carboxylates. Naturally, a dispersant polymer with basic amino groups will be able to have a stronger binding force through the acid-base interaction with these acidic groups and become more effective.

There are several direct and indirect methods for introducing the basic amine functional groups into a dispersant polymer. Yet, they all suffer from certain significant drawbacks. For example, amine containing monomers can be directly copolymerized into the dispersant polymer during the synthesis. However, the commercially available amine containing monomers are few. The amine groups can also be introduced by reacting an amine compound with the epoxide groups that are built into a polymer through a monomer like glycidyl methacrylate. However, only the secondary amines can be cleanly reacted with the epoxide groups without crosslinking/gelling the polymers. The choice is also limited.

Therefore, there is still a need for new chemistries and convenient methods to broaden the choices of the types of amine groups in order to optimize the performance of the pigment dispersants described above.

SUMMARY OF THE INVENTION

The present invention provides a composition suitable for use as a pigment dispersant, which comprises a graft copolymer, preferably an acrylic graft copolymer, wherein the graft copolymer has a weight average molecular weight of about 3,000–100,000 and comprises about 10–90% by weight of a polymeric backbone and correspondingly about 90–10% by weight of macromonomer side chains attached to the backbone wherein (1) the polymeric backbone is formed from polymerized ethylenically unsaturated monomers and (2) the side chains are macromonomers that are attached to the backbone at a single terminal point and formed from polymerized ethylenically unsaturated monomers and have a weight average molecular weight of about 1,000–30,000;

wherein the graft copolymer contains about 2 to 70% by weight, based on the total weight of the graft copolymer, of polymerized ethylenically unsaturated monomers containing functional acetoacetate groups that are polymerized into the backbone, the side chains or both, wherein the acetoacetate groups of the copolymer are reacted with a compound bearing a primary amine group to form an acetoacetyl amine pigment anchoring group on the graft copolymer.

The present invention also provides stable and non-flocculating pigment dispersions formed by combining the pigment dispersant of this invention with any number of commercially available pigments and an appropriate organic liquid carrier. These dispersions are particularly useful in solvent borne coatings, especially automotive paints, where they impart uniform color to the paint and, at the same time, provide improved efficiency of pigment use, lower paint viscosity, and reduced emission of volatile organic solvents.

DETAILED DESCRIPTION OF THE INVENTION

The novel pigment dispersant of this invention comprises a graft copolymer formed by the copolymerization of ethylenically unsaturated backbone monomers in the presence of a macromonomer. The macromonomer, which has only one terminal ethylenically unsaturated group, forms the side chains of the graft copolymer and is prepared first. It is then copolymerized with ethylenically unsaturated monomers chosen for the backbone composition to form the graft structure.

The graft copolymer contains about 10–90% by weight, preferably about 20–80% by weight, of polymeric backbone and correspondingly about 90–10% by weight, preferably about 80–20% by weight, of side chains. The graft copolymer has a weight average molecular weight of about 3,000–100,000 and preferably about 10,000–40,000. The side chains of the graft copolymer are formed from macromonomers that have a weight average molecular weight of about 1,000–30,000, and preferably about 2,000 to 15,000. All molecular weights referred herein are determined by GPC (gel permeation chromatography) using a polymethyl methacrylate standard.

The macromonomer useful in the present invention contains only one terminal ethylenically unsaturated group which is polymerized into the backbone of the graft copolymer. The preferred macromonomer is formed from polymerized acrylic monomers and in particular primarily from polymerized monomers of methacrylic acid, its esters, or mixtures of these monomers. Preferred monomers include methacrylic acid, alkyl methacrylates, cycloaliphatic methacrylates, and aryl methacrylates. Typical alkyl methacrylates that can be used have 1–18 carbon atoms in the alkyl group such as methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, 2-(2-methoxyethoxy)ethyl methacrylate, ethoxytriethyleneglycol methacrylate, and the like. Cycloaliphatic methacrylates also can be used such as trimethylcyclohexyl methacrylate, t-butyl cyclohexyl methacrylate, cyclohexyl methacrylate, isobornyl methacrylate, and the like. Aryl methacrylates also can be used such as benzyl methacrylate, phenyl methacrylate, and the like.

Other ethylenically unsaturated monomers can also be used for forming the macromonomer such as acrylic acid, alkyl acrylates, cycloaliphatic acrylates, and aryl acrylates can be used. Preferred alkyl acrylates have 1–18 carbon atoms in the alkyl group such as methyl acrylate, ethyl acrylate, propyl acrylate, isopropyl acrylate, n-butyl acrylate, isobutyl acrylate, t-butyl acrylate, 2-ethyl hexyl acrylate, nonyl acrylate, lauryl acrylate, 2-(2-methoxyethoxy)ethyl acrylate, 2-(2-ethoxyethoxy)ethyl acrylate, and the like. Cycloaliphatic acrylates can be used such as cyclohexylacrylate, trimethylcyclohexylacrylate, t-butyl cyclohexyl acrylate, and the like. Aryl acrylates such as benzyl acrylate, 2-phenoxyethyl acrylate, and the like can also be used. Apart from acrylic monomers, other polymerizable monomers that can be used for forming the macromonomer include vinyl aromatics such as styrene, t-butyl styrene and vinyl toluene, and the like. Methacrylonitrile and acrylonitrile monomers can also be used.

To ensure that the resulting macromonomer only has one terminal ethylenically unsaturated group which will polymerize with the backbone monomers to form the graft copolymer, the macromonomers are most conveniently prepared by a free radical polymerization method wherein ethylenically unsaturated monomers chosen for the macromonomer composition are polymerized in the presence of a catalytic cobalt chain transfer agent containing a $Co^{+2}$ group, a $Co^{+3}$ group, or both. The macromonomer polymerization is carried out in an organic solvent or solvent blend using conventional polymerization initiators. Typically in the first step of the process for preparing the macromonomer, the monomers are blend with an inert organic solvent and a cobalt chain transfer agent and heated usually to the reflux temperature of the reaction mixture. In subsequent steps additional monomers and cobalt chain transfer agent and conventional azo or peroxide type polymerization initiators are added and polymerization is continued at reflux until a macromonomer is formed of the desired molecular weight.

Preferred cobalt chain transfer agents are described in U.S. Pat. No. 4,680,352 to Janowicz et al and U.S. Pat. No. 4,722,984 to Janowicz, hereby incorporated by reference in their entirety. Most preferred cobalt chain transfer agents are pentacyano cobaltate (II), diaquabis (borondiflurodimethylglyoximato) cobaltate (II), and diaquabis (borondifluorophenylglyoximato) cobaltate (II). Typically these chain transfer agents are used at concentrations of about 2–5000 ppm based upon the particular monomers being polymerized and the desired molecular weight. By using such concentrations, macromonomers having the desired molecular weight can be conveniently prepared.

After the macromonomer is formed as described above, solvent is optionally stripped off and the backbone monomers are added to the macromonomer along with additional solvent and polymerization initiator, in order to prepare the basic graft copolymer structure by conventional free radical polymerization. The backbone monomers are copolymerized with the macromonomers via the single terminal unsaturated group of the macromonomer using any of the conventional azo or peroxide type initiators and organic solvents as described above. The backbone so formed contains polymerized ethylenically unsaturated monomers and any of the monomers listed above for use in the macromonomer may also be used in the backbone. Preferably, the backbone is formed from polymerized acrylic monomers, in particular primarily from polymerized acrylic acid, alkyl acrylate, cycloaliphatic acrylate, and aryl acrylate monomers as are listed above. Other preferred monomers include methacrylic acid, alkyl methacrylate, cycloaliphatic methacrylate, or aryl methacrylate monomers as are listed above. Polymerization is generally continued at the reflux temperature of the reaction mixture until a graft copolymer is formed having the desired molecular weight.

Typical solvents that can be used to form the macromonomer or the graft copolymer are alcohols, such as methanol, ethanol, n-propanol, and isopropanol; ketones, such as acetone, butanone, pentanone, hexanone, and methyl ethyl ketone; alkyl esters of acetic, propionic, and butyric acids, such as ethyl acetate, butyl acetate, and amyl acetate; ethers, such as tetrahydrofuran, diethyl ether, and ethylene glycol and polyethylene glycol monoalkyl and dialkyl ethers such as cellosolves and carbitols; and, glycols such as ethylene glycol and propylene glycol; and mixtures thereof.

Any of the commonly used azo or peroxy polymerization initiators can be used for preparation of the macromonomer or graft copolymer provided it has solubility in the solution of the solvents and the monomer mixture, and has an appropriate half life at the temperature of polymerization. "Appropriate half life" as used herein is a half life of about 10 minutes to 4 hours. Most preferred are azo type initiators such as 2,2'-azobis (isobutyronitrile), 2,2'-azobis (2,4-dimethylvaleronitrile), 2,2'-azobis (methylbutyronitrile), and 1,1'-azobis (cyanocyclohexane). Examples of peroxy based initiators are benzoyl peroxide, lauroyl peroxide, t-butyl peroxypivalate, t-butyl peroctoate which may also be used provided they do not adversely react with the chain transfer agents under the reaction conditions for macromonomers.

The graft copolymer of this invention also contains a polar pigment anchoring group attached to either or both the backbone or macromonomer side chains. Preferably, the pigment anchoring group is concentrated on the backbone of the graft copolymer. The pigment anchoring group employed in this invention is an acetoacetyl amine group which can be, and preferably is, obtained by copolymerizing ethylenically unsaturated monomers containing functional acetoacetate groups into the backbone or side chains or both and subsequently reacting the acetoacetate groups built in either or both the backbone or side chains with a primary amine. The reaction product acetoacetyl amine will be a 1/1 molar equivalent adduct of an acetoacetate group with a primary amine group. The reaction conditions are preferably chosen so that 100% of the acetoacetate groups are reacted, or as close to 100% as can be reasonably achieved, leaving essentially no unreacted acetoacetate groups in the dispersant molecule. Typically after the graft copolymer described above is formed, primary amine and additional solvent are added to the polymer solution and the reaction is continued until all the acetoacetate groups are reacted and the acetoacetyl amine anchoring groups are formed. Another approach to the introduction of acetoacetyl amine groups into the graft copolymer is by reacting acetoacetate monomers with a primary amine and subsequently polymerizing this acetoacetyl amine monomer into the backbone, side chain, or both.

A preferred ethylenically unsaturated acetoacetate functional monomer that is useful for introduction of acetoacetate functionality into the graft copolymer is acetoacetoxyethyl methacrylate. Examples of other monomers that can be used to introduce acetoacetate functionality into the graft copolymer include acetoacetoxyethyl acrylate, acetoacetoxypropyl methacrylate, acetoacetoxypropyl acrylate, allyl acetoacetate, acetoacetoxybutyl methacrylate, acetoacetoxybutyl acrylate, and the like. In general, any polymerizable hydroxy functional monomer can be converted to the corresponding acetoacetate by reaction with diketene or other suitable acetoacetating agent. Alternatively, the hydroxyl groups may be selectively built onto the polymer, either on the backbone or in the arms, through the use of hydroxyl containing monomers. They are subsequently treated with acetoacetating agent such as t-butyl acetoacetate at elevated temperature and converted to the acetoacetate groups of the invention.

Examples of primary amines which are useful for forming the anchoring groups are aromatic amines, aliphatic amines, and primary amines containing heterocyclic groups. Aromatic amines that can be used include N-benzylamine, phenethylamine, 4-phenylbutylamine, 2,2-diphenylethylamine, and the like. Aliphatic amines can also be used such as propylamine, butylamine, aminoethanol, 2-amino-1-butanol, N,N-dimethylaminopropylamine, and the like. Primary amines containing heterocyclic groups can also be advantageously used because additional interactions between the heterocyclic groups and the pigment surfaces may further enhance the dispersion stability. The heterocyclic group can be a mono- or dinuclear five to seven member ring containing one or more nitrogen atoms as part of the ring and optionally an oxygen and/or sulfur atom. Useful examples include 4-(aminoethyl)morpholine, 2-(2-aminoethyl)-1-methyl pyrrolidine, 1-(2-aminoethyl) pyrrolidine, 2-(2-aminoethyl)pyridine, 1-(2-aminoethyl) piperazine, 1-(2-aminoethyl)piperidine, 1-(3-aminopropyl) imidazole, 4-(3-aminopropyl)morpholine, 1-(3-aminopropyl)-2-pipecoline, 1-(3-aminopropyl)-2-pyrrolidinone, and the like. Primary amines containing heterocyclic imidazole groups are particularly preferred.

In certain embodiments, the primary amine compound may contain both primary amine functionality, for acetoacetyl amine formation, and tertiary amine functionality. In this case, the tertiary amine functional graft copolymer can be, and preferably is, treated with a proton source or an alkylating agent to form a cationic quaternary ammonium group on the graft copolymer as the pigment anchoring group. Total alkylation should be at least about 30% of the tertiary amine moieties, preferably at least about 50% up to about 100%. Typical alkylation agents include aralkyl halides, alkyl halides, alkyl toluene sulfonate, or trialkyl phosphates halides. Alkylation agents which have been found to be particularly satisfactory include, benzyl chloride, methyl toluene sulfonate, and dimethyl sulfate.

The amount of acetoacetate functional monomer required will vary from case to case depending upon the desired degree of pigment anchoring necessary for the particular end use application. Generally, the concentration of acetoacetate functional monomers that are used to form the pigment anchoring groups in the graft copolymer should be at least about 1% by weight, based on the total weight of the graft copolymer, to impart appropriate pigment anchoring functionality to the graft copolymer. At lower concentrations, there may not be sufficient interaction with the pigment to avoid flocculation, particularly in more polar solvents. The preferred concentration of these monomers is about 2 to about 70% by weight, and more preferably about 5–20% by weight, based on the total weight of the graft copolymer.

In addition to the acetoacetyl amine pigment anchoring groups, the graft copolymer may also contain one or more additional anchoring groups in the selected anchoring segment. Particularly useful anchoring groups that work nicely in conjunction with acetoacetyl amine anchoring groups, are acyclic or cyclic amide groups. These anchoring groups can be, and preferably are, obtained by copolymerizing ethylenically unsaturated monomers containing acyclic or cyclic amide functionality into the desired segment during its polymerization. Acrylic, methacrylic and other vinyl amide monomers are generally preferred.

Useful examples of monomers that can be used to introduce acyclic amide groups include methacrylamides such as N-methylmethacrylamide, N-ethylmethacrylamide, N-octylmethacrylamide, N-dodecylmethacrylamide, N-(isobutoxymethyl)methacrylamide, N-phenylmethacrylamide, N-benzyl methacrylamide, N,N-dimethyl methacrylamide, and the like and acrylamides such as N-methylacrylamide, N-ethylacrylamide, N-t-butylacrylamide, N-(isobutoxymethyl)acrylamide, N,N-dimethylacrylamide, N,N-diethylacrylamide, N,N-dibutylacrylamide, and the like. Other monomers that can be used to introduce cyclic amide groups include methacrylic and acrylic and other vinyl monomers bearing cyclic amide groups, especially N-vinyl-2-pyrrolidinone and the like. Generally, the graft copolymers may contain up to 20% by weight, based on the total weight of the copolymer, of such amide functional monomers.

In addition to the anchoring groups described above, the graft copolymer may also, and preferably does, contain up to about 30% by weight, based on the total weight of the graft copolymer, of ethylenically unsaturated monomers that contain functional groups, such as hydroxyl groups, that will react with the film forming components present in the paint composition which in turn enables the dispersant to become a permanent part of the final network. This structure enhances film adhesion, improves the overall mechanical properties of the paint in general, and prevents deterioration or delamination of the film upon aging, as may occur if the dispersant remained an unreacted component. The hydroxyl groups, for example, may be placed in the backbone or in the macromonomer arms, or both. The preferred location is in the segment with the pigment anchoring groups.

While a wide variety of ethylenically unsaturated monomers can be used to introduce hydroxyl groups into the desired segment during its polymerization, acrylic monomers and in particular hydroxy functional acrylate and methacrylate monomers are preferred. Hydroxy functional methacrylates that can be used include 2-hydroxyethyl methacrylate, 3-hydroxypropyl methacrylate, 4-hydroxylbutyl methacrylate, and the like. Hydroxyl acrylates can also be used such as 2-hydroxyethyl acrylate, 3-hydroxypropyl acrylate, 4-hydroxybutyl acrylate, and the like.

Particularly useful graft copolymers of this invention are exemplified in the examples given below.

While not wishing to be bound by any particular theory, these graft polymers when used as pigment dispersants are thought to work by anchoring onto and forming a layer of polymer surrounding the pigment particle, which layer extends into the surrounding solvent medium to provide steric stabilization of the pigment particles. The pigment particles then do not come close enough to one another to flocculate, unless there is insufficient interaction between the dispersant polymer and the pigment surfaces. The pigment anchoring groups employed herein have been found to effectively interact with a much wider range of pigments, which enables the graft copolymers of the present invention to be selectively adsorbed by a wider range of pigments and not be displaced from pigment surfaces by polar solvents or other polar functional groups present in the paint system which could compete for adsorption on the pigment surfaces. Stable and non-flocculating dispersions or millbases can thus easily be formed from the graft copolymers of this invention.

To form a pigment dispersion or a millbase, pigments are typically added to the graft copolymer in the customary organic solvent or blend and are dispersed using conventional techniques such as high speed mixing, ball milling, sand grinding, attritor guiding, or two or three roll milling. The resulting pigment dispersion has a pigment to dispersant binder weight ratio of about 0.1/100 to 2000/100.

Any of the conventional pigments used in paints can be used to form the pigment dispersion. Examples of suitable pigments include metallic oxides such as titanium dioxide, iron oxides of various colors, and zinc oxide; carbon black; filler pigments such as talc, china clay, barytes, carbonates, and silicates; a wide variety of organic pigments such as quinacridones, phtalocyanines, perylenes, azo pigment, and indanthrones carbazoles such as carbazole violet, isoindolinones, isoindolons, thioindigio reds, and benzimidazolinones; and metallic flakes such as aluminum flake, pearlescent flakes, and the like.

It may be desirable to add other optical ingredients to the pigment dispersion such as antioxidants, flow control agents, UV stabilizers, light quenchers and absorbers, and rheology control agents such as fumed silica and microgels. Other film forming polymers can also be added such as acrylics, acrylourethanes, polyester urethanes, polyesters, alkyds, polyethers and the like.

Pigment dispersions of this invention can be added to a variety of solvent borne coating or paint compositions such as primers, primer surfacers, topcoats which may be monocoats, or basecoats of a clearcoat/basecoat finish. These compositions may contain film-forming polymers such as hydroxy functional acrylic and polyester resins and crosslinking agents such as blocked isocyanates, alkylated melamines, polyisocyanates, epoxy resins, and the like. Preferably, the graft copolymer contains functional groups that will become part of the final network structure by reacting with the crosslinkers.

The following examples illustrate the invention. All parts and percentages are on a weight basis unless otherwise indicated. All molecular weights are determined by (GPC) gel permeation chromatography using a polymethyl methacrylate standard. Mn represents number average molecular weight and Mw represents weight average molecular weight. All viscosity measurements are reported using a Gardner Holtz scale.

EXAMPLES

Macromonomers were prepared and formulated into graft copolymer dispersants and these polymeric dispersants were then formulated into pigment dispersions which were evaluated for performance.

Example 1

Preparation of AAEM/ETEGMA Macromonomer, 85/15% by Weight

This example illustrates the preparation of a macromonomer that can be used to form a graft copolymer of this invention. A 5-liter flask was equipped with a thermometer, stirrer, additional funnels, heating mantle, reflux condenser and a means of maintaining a nitrogen blanket over the reactants. The flask was held under nitrogen positive pressure and the following ingredients were employed.

|  | Weight (gram) |
| --- | --- |
| Portion 1 | |
| Methyl ethyl ketone | 575.0 |
| 2-acetoacetoxyethyl methacrylate (AAEM) | 367.2 |
| Ethoxytriethyleneglycol methacrylate (ETEGMA) | 64.8 |
| Portion 2 | |
| diaquabis(borondifluorodiphenyl glyoximato) cobaltate (II), Co(DPG-BF$_2$) | 0.216 |
| methyl ethyl ketone | 60.0 |
| Portion 3 | |
| 2,2'-azobis(2,4-dimethylvaleronitrile) (Vazo ® 52 by DuPont Co., Wilmington, DE) | 3.0 |
| methyl ethyl ketone | 45.0 |
| Portion 4 | |
| 2-acetoacetoxyethyl methacrylate (AAEM) | 1468.8 |
| Ethoxytriethyleneglycol methacrylate (ETEGMA) | 259.2 |
| Portion 5 | |
| 2,2'-azobis(2,4-dimethylvaleronitrile) (Vazo ® 52 by DuPont Co., Wilmington, DE) | 300 |
| methyl ethyl ketone | 450.0 |
| Total | 3323.22 |

Portion 1 mixture was charged to the flask and the mixture was heated to reflux temperature and refluxed for about 10 minutes. Portion 2 solution was then added to the flask over a 5 minutes period and the reaction mixture was refluxed for another 10 minutes. Portion 3 was then added over 5 minutes while the reaction mixture was held at reflux temperature. Portion 4 and Portion 5 were then simultaneously added to the reactor over 240 minutes while the reaction mixture was held at reflux temperature throughout the course of additions. Reflux was continued for another 2 hours and the solution was cooled to room temperature and filled out. The resulting macromonomer solution was a light yellow clear polymer solution and had a solid content of about 64.0% with a Gardener-Holtz viscosity of A-4. The macromonomer had a 3,556 Mw and 2,240 Mn.

Example 2

Preparation of BMA/MMA Macromonomer, 50/50% by Weight

This example illustrates the preparation of a macromonomer that can be used to form a graft copolymer of this invention.

A 5-liter flask was equipped as in Example 1. The flask was held under nitrogen positive pressure and the following ingredients were employed.

| | Weight (gram) |
|---|---|
| Portion 1 | |
| methyl ethyl ketone | 837.0 |
| butyl methacrylate (BMA) | 216.0 |
| methyl methacrylate (MMA) | 216.0 |
| Portion 2 | |
| diaquabis(borondifluorodiphenyl glyoximato) cobaltate (II), Co(DPG-BF$_2$) | 0.086 |
| methyl ethyl ketone | 60.0 |
| Portion 3 | |
| 2,2'-azobis(2,4-dimethylvaleronitrile) (Vazo ® 52 by DuPont Co., Wilmington, DE) | 3.0 |
| methyl ethyl ketone | 60.0 |
| Portion 4 | |
| butyl methacrylate (BMA) | 864.0 |
| methyl methacrylate (MMA) | 864.0 |
| Portion 5 | |
| 2,2'-azobis(2,4-dimethylvaleroritrile) (Vazo ® 52 by DuPont Co., Wilmington, DE) | 30.0 |
| methyl ethyl ketone | 450.0 |
| Total | 3600.09 |

The procedure of Example 1 was repeated. The resulting macromonomer solution was a light yellow clear polymer solution and had a solid content of about 51.8% with a Gardener-Holtz viscosity of A. The macromonomer had a 5,183 Mw and 1,825 Mn.

Example 3

Preparation of BMA/MMA Macromonomer, 50/50% by Weight

This example illustrates the preparation of a macromonomer of higher molecular weight than Example 2.

A 12-liter flask was equipped as in Example 1. The flask was held under nitrogen positive pressure and the following ingredients were employed.

| | Weight (gram) |
|---|---|
| Portion 1 | |
| methyl ethyl ketone | 1320.0 |
| methyl methacrylate (MMA) | 518.4 |
| butyl methacrylate (BMA) | 518.4 |
| Portion 2 | |
| diaquabis(borondifluorodiphenyl glyoximato) cobaltate (II), Co(DPG-BF$_2$) | 0.102 |
| methyl ethyl ketone | 167.9 |
| Portion 3 | |
| 2,2'-azobis(methylbutyronitrile) (Vazo ® 67 by DuPont Co., Wilmington, DE) | 8.49 |
| methyl ethyl ketone | 110 |
| Portion 4 | |
| methyl methacrylate (MMA) | 2073.6 |
| butyl methacrylate (BMA) | 2073.6 |
| Portion 5 | |
| 2,2'-azobis(methylbutyronitrile) (Vazo ® 67 by DuPont Co., Wilmington, DE) | 84.9 |
| methyl ethyl ketone | 1100 |

| | Weight (gram) |
|---|---|
| Total | 7975.39 |

The procedure of Example 1 was repeated except that Portion 1 mixture was refluxed for about 20 minutes, instead of 10 minutes, before Portion 2 solution was added to the flask. The resulting macromonomer solution was a light yellow clear polymer solution and had a solid content of about 65.3%. The macromonomer had a 5,617 Mw and 3,677 Mn.

Example 4

Preparation of BMA/MMA Macromonomer, 70/30% by Weight

This example illustrates the preparation of a macromonomer that can be used to form a graft copolymer of this invention.

A 12-liter flask was equipped as in Example 1. The flask was held under nitrogen positive pressure and the following ingredients were employed.

| | Weight (gram) |
|---|---|
| Portion 1 | |
| methyl ethyl ketone | 1320.0 |
| methyl methacrylate (MMA) | 311.0 |
| butyl methacrylate (BMA) | 725.8 |
| Portion 2 | |
| diaquabis(borondifluorodiphenyl glyoximato) cobaltate (II), Co(DPG-BF$_2$) | 0.114 |
| methyl ethyl ketone | 178.3 |
| Portion 3 | |
| 2,2'-azobis(methylbutyronitrile) (Vazo ® 67 by DuPont Co., Wilmington, DE) | 7.54 |
| methyl ethyl ketone | 110 |
| Portion 4 | |
| methyl methacrylate (MMA) | 1244.2 |
| butyl methacrylate (BMA) | 2903.0 |
| Portion 5 | |
| 2,2'-azobis(methylbutyronitrile) (Vazo ® 67 by DuPont Co., Wilmington, DE) | 75.4 |
| methyl ethyl ketone | 1100 |
| Total | 7975.35 |

The procedure of Example 1 was repeated except that Portion 1 mixture was refluxed for about 20 minutes, instead of 10 minutes, before Portion 2 solution was added to the flask. The resulting macromonomer solution was a light yellow clear polymer solution and had a solid content of about 63.2% with a Gardner-Holtz viscosity of I. The macromonomer had a 6,148 Mw and 3,863 Mn.

Example 5

Preparation of a Reverse Graft Copolymer Having Acetoacetyl Amine Groups on the Arms This example shows the preparation of a reverse graft copolymer of this invention containing acetoacetyl/amine groups, specifically butyl acrylate-co-methyl methacrylate-g-2-acetoacetoxyethyl methacrylate (1-(3-aminopropyl)imidazole)-co-ethoxytriethyleneglycol methacrylate, 40.93/31.83//15.46(9.05)/2.73% by weight. By "reverse", it is meant that the anchoring groups are concentrated on the macromonomer arms. A 2-liter flask was equipped as in Example 1. The flask was held under nitrogen positive pressure and the following ingredients were employed.

|  | Weight (gram) |
| --- | --- |
| Portion 1 | |
| Macromonomer from Example 1 | 246.2 |
| methyl ethyl ketone | 100 |
| Portion 2 | |
| t-butyl peroxypivalate (75%, Elf Atochem North America, Inc., Philadelphia, PA) | 2.50 |
| methyl ethyl ketone | 30 |
| Portion 3 | |
| butyl acrylate | 360.0 |
| methyl methacrylate | 280.0 |
| Portion 4 | |
| t-butyl peroxypivalate (75%, Elf Atochem North America, Inc., Philadelphia, PA) | 18.0 |
| methyl ethyl ketone | 180.0 |
| Portion 5 | |
| t-butyl peroxypivalate (75%, Elf Atochem North America, Inc., Philadelphia, PA) | 2.5 |
| methyl ethyl ketone | 30 |
| Portion 6 | |
| 1-(3-aminopropyl)imidazole (Aldrich Chemical Co. Inc., Milwaukee, WI) | 81.1 |
| Propyleneglycol monomethyl ether acetate | 240.0 |
| Total | 1570.3 |

Portion 1 was charged to the flask and the mixture was heated to reflux temperature and refluxed for about 10 minutes. Portion 2 was added over 5 minutes. Portions 3 and 4 were then simultaneously added over 3 hours while the reaction mixture was held at reflux temperature. The reaction mixture was refluxed for 1 hours. Portion 5 was added over 5 minutes, and the reaction mixture was refluxed for another 2 hours. Portion 6 mixture was added and refluxed for another 3 hours. After cooling the polymer solution was filled out to yield a 53.6% polymer solution with a Gardner-Holtz viscosity of V. The graft copolymer before reaction with 1-(3-aminopropyl)imidazole had a 53,182 Mw and 13,971 Mn.

Example 6

Preparation of a Reverse Graft Copolymer Having Acetoacetyl Amine Groups on the Arms This example shows the preparation of a reverse graft copolymer of this invention containing acetoacetyl/amine groups, specifically butyl acrylate-co-2-ethylhexyl acrylate-co-methyl methacrylate-co-2-hydroxyethyl methacrylate-g-2-acetoacetoxyethyl methacrylate (1-(3-aminopropyl)imidazole)-co-ethoxytriethyleneglycol methacrylate, 18.19/27.29/18.19/9.10//15.46(9.05)/2.73% by weight.

A 2-liter flask was equipped as in Example 1. The flask was held under nitrogen positive pressure and the following ingredients were employed.

|  | Weight (gram) |
| --- | --- |
| Portion 1 | |
| Macromonomer from Example 1 | 246.2 |
| methyl ethyl ketone | 100 |
| Portion 2 | |
| t-butyl peroxypivalate (75%, Elf Atochem North America, Inc., Philadelphia, PA) | 2.50 |
| methyl ethyl ketone | 30 |
| Portion 3 | |
| butyl acrylate | 160.0 |
| 2-ethylhexyl acrylate | 240.0 |
| methyl methacrylate | 160.0 |
| 2-hydroxyethyl methacrylate | 80.0 |
| Portion 4 | |
| t-butyl peroxypivalate (75%, Elf Atochem North America, Inc., Philadelphia, PA) | 18.0 |
| methyl ethyl ketone | 180.0 |
| Portion 5 | |
| t-butyl peroxypivalate (75%, Elf Atochem North America, Inc., Philadelphia, PA) | 2.5 |
| methyl ethyl ketone | 30 |
| Portion 6 | |
| 1-(3-aminopropyl)imidazole (Aldrich Chemical Co. Inc., Milwaukee, WI) | 81.1 |
| Propyleneglycol monomethyl ether acetate | 186.0 |
| Total | 1516.3 |

The procedure of Example 5 was repeated. After cooling, the polymer solution was filled out to yield a 55.7% polymer solution with a Gardner-Holtz viscosity of V. The graft copolymer before reaction with 1-(3-aminopropyl)imidazole had a 50,758 Mw and 13,634 Mn.

Example 7

Preparation of a Regular Graft Copolymer Having Acetoacetyl Amine Groups on the Backbone This example shows the preparation of a regular graft copolymer of this invention containing acetoacetyl/amine groups, specifically 2-phenoxyethyl acrylate-2-acetoacetoxyethyl methacrylate (1-(3-aminopropyl)imidazole)-g-methyl methacrylate-co-butyl methacrylate, 44.76/17.91(10.47)//13.43/13.43% by weight. By "regular", it is meant that the anchoring groups are concentrated on the backbone.

A 2-liter flask was equipped as in Example 1. The flask was held under nitrogen positive pressure and the following ingredients were employed.

|  | Weight (gram) |
| --- | --- |
| Portion 1 | |
| Macromonomer from Example 2 | 400.0 |
| butyl acetate | 100.0 |
| Portion 2 | |
| t-butyl peroctoate (Elf Atochem North America, Inc., Philadelphia, PA) | 2.00 |
| butyl acetate | 30 |
| Portion 3 | |

| | Weight (gram) |
|---|---|
| 2-phenoxyethyl acrylate | 400.0 |
| 2-acetoacetoxyethyl methacrylate (AAEM) | 160.0 |
| Portion 4 | |
| t-butyl peroxypivalate (75%, Elf Atochem North America, Inc., Philadelphia, PA) | 17.5 |
| methyl ethyl ketone | 75.0 |
| butyl acetate | 75.0 |
| Portion 5 | |
| t-butyl peroctoate (Elf Atochem North America, Inc., Philadelphia, PA) | 2.0 |
| butyl acetate | 30 |
| Portion 6 | |
| 1-(3-aminopropyl)imidazole (Aldrich Chemical Co. Inc., Milwaukee, WI) | 95.5 |
| Total | 1387.0 |

The procedure of Example 5 was repeated except that after the addition of Portion 5, the reaction mixture was refluxed only for another 1 hour instead of 2 hours. After cooling the polymer solution was filled out to yield a 69.4% polymer solution with a Gardner-Holtz viscosity of Z9. The graft copolymer before reaction with 1-(3-aminopropyl) imidazole had a 47,551 Mw and 9,951 Mn.

Example 8

Preparation of a Regular Graft Copolymer Having Acetoacetyl Amine and Acyclic Amide Groups on the Backbone This example shows the preparation of a regular graft copolymer of this invention containing acetoacetyl/amine groups and acyclic amide groups, specifically N,N-dimethyl acrylamide-co-2-hydroxyethyl acrylate-2-acetoacetoxyethyl methacrylate (1-(3-aminopropyl)imidazole)-g-methyl methacrylate-co-butyl methacrylate, 11.59/7.73/5.80(3.39)//35.75/35.75% by weight.

A 2-liter flask was equipped as in Example 1. The flask was held under nitrogen positive pressure and the following ingredients were employed.

| | Weight (gram) |
|---|---|
| Portion 1 | |
| Macromonomer from Example 3 | 819.7 |
| ethyl acetate | 25.0 |
| Portion 2 | |
| N,N-dimethyl acrylamide | 86.4 |
| 2-acetoacetoxyethyl methacrylate (AAEM) | 43.2 |
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |
| Portion 4 | |
| 1-(3-aminopropyl)imidazole (Aldrich Chemical Co., Inc. Milwaukee, WI) | 25.78 |
| Propyleneglycol monomethyl ether acetate | 350.0 |
| Portion 5 | |

| | Weight (gram) |
|---|---|
| butyl acetate | 313.8 |
| Total | 1821.48 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for 1 hour. Portion 4 mixture was added, and about 330.0 grams of volatile solvents were distilled by gradually raising the reaction temperature. The total reaction time including the time required for the distillation is 3 hours. Portion 5 was added. After cooling the polymer solution was filled out to yield a 52.2% polymer solution with a Gardner-Holtz viscosity of X+1/4. The graft copolymer before reaction with 1-(3-aminopropyl)imidazole had a 23,143 Mw and 8,218 Mn.

Example 9

Preparation of a Regular Graft Copolymer Having Acetoacetyl Amine Groups on the Backbone This example shows the preparation of a regular graft copolymer of this invention containing acetoacetyl/amine groups, specifically methyl acrylate-co-2-hydroxyethyl acrylate-2-acetoacetoxyethyl methacrylate (1-(3-aminopropyl)imidazole)-g-methyl methacrylate-co-butyl methacrylate, 11.59/7.73/5.80(3.39)//50.04/21.45% by weight.

A 2-liter flask was equipped as in Example 1. The flask was held under nitrogen positive pressure and the following ingredients were employed.

| | Weight (gram) |
|---|---|
| Portion 1 | |
| Macromonomer from Example 4 | 901.7 |
| ethyl acetate | 27.5 |
| Portion 2 | |
| methyl acrylate | 95.0 |
| 2-acetoacetoxyethyl methacrylate (AAEM) | 47.5 |
| 2-hydroxyethyl acrylate | 63.4 |
| Portion 3 | |
| t-butyl peroctoate (Elf Atochem North America, Inc., Philadelphia, PA) | 11.0 |
| ethyl acetate | 99.0 |
| Portion 4 | |
| 1-(3-aminopropyl)imidazole (Aldrich Chemical Co., Inc. Milwaukee, WI) | 25.78 |
| Propyleneglycol monomethyl ether acetate | 350.0 |
| Portion 5 | |
| butyl acetate | 313.8 |
| Total | 1934.68 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for 1 hour. After cooling, a sample of about 100 g of the prepolymer was taken from the reactor, and will be used as a comparative example for the dispersion test. The reaction mixture was heated to reflux again under nitrogen blanket. Portion 4 mixture was added, and about 330.0 grams of volatile solvents were distilled by gradually raising the reaction temperature. The total reaction time including the time required for the distillation is 3 hours. Portion 5 was added. After cooling the polymer solution was filled out to yield a 50.8% polymer solution with a Gardner-Holtz viscosity of M. The graft copolymer before reaction with 1-(3-aminopropyl)imidazole had a 19,698 Mw and 7,640 Mn.

Example 10

Preparation of a Graft Copolymer Having Acetoacetyl Amine and Cyclic Amide Groups on the Backbone This example shows the preparation of a regular graft copolymer of this invention containing acetoacetyl/amine groups and cyclic amide groups, specifically N-vinyl-2-pyrrolidinone-co-2-hydroxyethyl acrylate-2-acetoacetoxyethyl methacrylate (1-(3-aminopropyl) imidazole)-g-methyl methacrylate-co-butyl methacrylate, 11.59/7.73/5.80(3.39)//50.04/21.45% by weight.

A 2-liter flask was equipped as in Example 1. The flask was held under nitrogen positive pressure and the following ingredients were employed.

|  | Weight (gram) |
|---|---|
| Portion 1 | |
| Macromonomer from Example 4 | 819.7 |
| ethyl acetate | 25.0 |
| Portion 2 | |
| N-vinyl-2-pyrrolidinone | 86.4 |
| 2-acetoacetoxyethyl methacrylate (AAEM) | 43.2 |
| 2-hydroxyethyl acrylate | 57.6 |
| Portion 3 | |
| t-butyl peroctoate (Elf Atochem North America, Inc., Philadelphia, PA) | 10.0 |
| ethyl acetate | 90.0 |
| Portion 4 | |
| 1-(3-aminopropyl)imidazole (Aldrich Chemical Co., Inc. Milwaukee, WI) | 25.78 |
| propyleneglycol monomethyl ether acetate | 350.0 |
| Portion 5 | |
| butyl acetate | 313.8 |
| Total | 1821.48 |

The procedure of Example 8 was repeated. After cooling the polymer solution was filled out to yield a 49.9% polymer solution with a Gardner-Holtz viscosity of W. The graft copolymer before reaction with 1-(3-aminopropyl)imidazole had a 28,152 Mw and 9,110 Mn.

Comparative Example 1

This shows the preparation of a graft copolymer containing no specific pigment anchoring groups for comparative purposes, specifically methyl acrylate-co-2-hydroxyethyl acrylate-g-butyl methacrylate-co-methyl methacrylate, 17/8//37.5/37.5% by weight, from a macromonomer using the following ingredients.

|  | Weight (gram) |
|---|---|
| Portion 1 | |
| Macromonomer from Example 3 | 830.8 |
| ethyl acetate | 10.0 |
| Portion 2 | |
| methyl acrylate | 122.4 |
| 2-hydroxyethyl acrylate | 57.6 |
| Portion 3 | |
| t-butyl peroctoate (Elf Atochem North America, Inc., Philadelphia, PA) | 9.0 |
| ethyl acetate | 90.0 |
| Portion 4 | |
| propyleneglycol monomethyl ether acetate | 480.2 |
| Total | 1600.00 |

The procedure of Example 2 was repeated to yield a 49.1% clear polymer solution. This graft copolymer contains a copolymer of methyl acrylate, and 2-hydroxyethyl acrylate in the backbone and a random copolymer of butyl methacrylate and methyl methacrylate in the arms. The graft copolymer had a 52,927 Mw and 12,000 Mn and a Gardner-Holtz viscosity of P.

Comparative Example 2

The prepolymer of Example 9 was extracted before the AAEM groups were reacted with the amine and used here for comparative purposes. It is a regular graft copolymer containing acetoacetyl groups only, specifically methyl acrylate-co-2-hydroxyethyl acrylate-2-acetoacetoxyethyl methacrylate-g-methyl methacrylate-co-butyl methacrylate, 12/8/6//51.8/22.2% by weight. It is a 63.9% clear polymer solution with a Gardner-Holtz viscosity of V. The graft copolymer had a 19,698 Mw and 7,640 Mn.

Comparative Example 3

Preparation of a Random Copolymer with Acetoacetyl Amine Groups

This shows the preparation of a random copolymer containing the acetoacetyl/amine groups, specifically methyl acrylate-co-2-hydroxyethyl acrylate-co-2-acetoacetoxyethyl methacrylate (1-(3-aminopropyl)imidazole)-co-butyl methacrylate-co-methyl methacrylate, 11.59/7.73/5.80 (3.39)/50.04/21.45% by weight. It has the exact monomer composition of Example 9 with the only difference in the polymer structures.

A 2-liter flask was equipped as in Example 1. The flask was held under nitrogen positive pressure and the following ingredients were employed.

|  | Weight (gram) |
|---|---|
| Portion 1 | |
| butyl acetate | 554.6 |
| Portion 2 | |

-continued

| | Weight (gram) |
|---|---|
| methyl acrylate | 86.4 |
| 2-acetoacetoxyethyl methacrylate (AAEM) | 43.2 |
| 2-hydroxyethyl acrylate | 57.6 |
| butyl methyacrylate | 373.0 |
| methyl methacrylate | 159.8 |
| Portion 3 | |
| t-butyl peroxy isobutyrate (75% by wt, Elf Atochem North America, Inc., Philadelphia, PA) | 15.4 |
| butyl acetate | 150.0 |
| Portion 4 | |
| 1-(3-aminopropyl)imidazole (Aldrich Chemical Co., Inc. Milwaukee, WI) | 25.8 |
| butyl acetate | 24.7 |
| Total | 1490.5 |

Portion 1 was charged to the flask and the mixture was heated to reflux temperature and refluxed for about 10 minutes. Portions 2 and 3 were simultaneously added over 3 hours while the reaction mixture was held at reflux temperature. The reaction mixture was refluxed for about 1 hour. Portion 4 mixture was added and refluxed for another 3 hours. After cooling the polymer solution was filled out to yield a 50.3% polymer solution with a Gardner-Holtz viscosity of N. The random copolymer before reaction with 1-(3-aminopropyl)imidazole had a 21,946 Mw and 9,709 Mn.

Example 11

Evaluation of Dispersant Properties

The dispersant effectiveness was determined by sand-grinding a mixture of pigment, solvent, and dispersant, and observing the dispersion quality under an Olympus microscope, 40X. The well dispersed system would have a uniform appearance and the pigment particles would show vigorous Brownian motion. In contract, the flocculated systems would have islands of flocculated pigment chunks interspersed with areas of relatively clear solvent. The dispersion samples were prepared by the following procedure. To a 2 oz. glass bottle, 15 gm of sand, 20 gm of butyl acetate, 2 gm of pigment and 1 gm of the graft copolymer dispersant solution were added. The bottle was sealed and agitated on a Red Devil plant shaker for 15 minutes.

| | Results | | | | | | | | |
|---|---|---|---|---|---|---|---|---|---|
| Pigment | Ex 5 | Ex 6 | Ex 7 | Ex 8 | Ex 9 | Ex 10 | CEx 1 | CEx 2 | CEx 3 |
| 1 | D | D | F | F | na | na | F | NA | na |
| 2 | D | D | D | F | F | SF | F | F | F |
| 3 | F | F | F | D | D | D | F | F | D |
| 4 | D | D | D | D | D | D | D | D | D |
| 5 | D | SF | D | D | D | D | F | F | D |
| 6 | D | SF | D | D | D | D | D | D | F |
| 7 | F | F | F | F | F | F | F | F | F |
| 8 | D | SF | D | D | D | D | D | D | D |
| 9 | D | D | D | D | D | D | D | D | D |
| 10 | F | F | D | D | D | F | D | D | D |
| 11 | D | D | D | F | F | F | F | F | F |
| 12 | D | D | D | D | D | D | D | D | D |
| 13 | D | SF | D | D | D | D | F | F | F |
| 14 | D | F | F | D | D | D | D | D | F |
| 15 | D | D | D | D | D | D | D | D | D |
| 16 | D | D | D | D | D | D | D | F | F |

D: Deflocculated or dispersed
SF: Slightly flocculated
F: Flocculated
na: not available
1. Monastral Red YRT-759D (Ciba-Geigy Corp., Pigment Div., Newport, DE)
2. Irgazin DPP Red BO (Ciba-Geigy Corp., Pigment Div., Newport, DE)
3. Raven 5000 carbon black (Columbian Chemicals Co., Atlanta, GA))
4. Titanium dioxide R706 (DuPont Co., Wilmington, DE)
5. Sunfast green 7 (Sun Chemical Corp., Cincinnati, OH))
6. Endurophthal blue BT-617D (Clariant Corp., Coventry, RI)
7. Irgazin blue ATC (Ciba-Geigy Corp., Pigment Div., Newport, DE)
8. Magenta RT-355D (Ciba-Geigy Corp., Pigment Div., Newport, DE)
9. Perylene maroon R-6436 (Bayer Corp., Pittsburgh, PA)
10. Sicotrans red (BASF Corp., Colorant Division, Mount Olive, NJ))
11. Hostaperm yellow H-3G (Clariant Corp., Coventry, RI)
12. Irgacolor yellow (Ciba-Geigy Corp., Pigment Div., Newport, DE)
13. Irgazin blue X-3367 (Ciba-Geigy Corp., Pigment Div., Newport, DE)
14. Violet RT-101D (Ciba-Geigy Corp., Pigment Div., Newport, DE)
15. Bayferrox 3920 (Bayer Corp., Pittsburgh, PA)
16. Monastral magenta RT-143D (Ciba Geigy Corp., Pigment Div., Newport, DE)

Based on these test results, the graft structure and the polar groups such as the hydroxyl and the acetoacetyl groups have provided some dispersing power to the polymer as in the Comparative Example 1 and 2. Comparative Example 3 shows that with the strong pigment anchoring groups of this invention even a random copolymer can disperse some of the pigments. However, the ones with the graft structure where the pigment anchoring groups are segmented from the stabilizing groups, and having the amide functional groups and the additional specific pigment anchoring groups of this invention are far more effective for a wider range of pigment types.

Various modifications, alterations, additions or substitutions of the components of the compositions of this invention will be apparent to those skilled in the art without departing from the spirit and scope of this invention. This invention is not limited by the illustrative embodiments set forth herein, but rather is defined by the following claims.

What is claimed is:

1. A composition suitable for use as a pigment dispersant, comprising a graft copolymer having functional acetoacetate groups on polymeric backbone and/or macromonomer side chains grafted to the backbone, wherein
   (1) the polymeric backbone consists essentially of polymerized ethylenically unsaturated monomers and
   (2) the side chains are macromonomers that are grafted to the backbone at a single terminal point and consist essentially of polymerized ethylenically unsaturated monomers;
   wherein the graft copolymer has attached to either the backbone, the side chains or both, an acetoacetyl amine pigment anchoring group produced by reacting functional acetoacetate groups in the backbone, the side chains or both with a primary amine.

2. The composition of claim 1 wherein the graft copolymer is formed from polymerized acrylic and/or methacrylic monomers.

3. The composition of claim 1 wherein the pigment anchoring group is formed by copolymerizing acetoacetate functional acrylic and/or methacrylic monomers into either the backbone, the side chains, or both, and reacting the acetoacetate groups built into the copolymer with a primary amine.

4. The composition of claim 1 wherein the primary amine used to form the pigment anchoring group is selected from the group consisting of aliphatic, aromatic, and heterocyclic group containing amines.

5. The composition of claim 1 wherein the pigment anchoring group contains tertiary amine functionality and is further quaternized to produce a quaternary ammonium group on the graft copolymer.

6. The composition of claim 1 wherein the graft copolymer comprises about 10–90% by weight of polymeric backbone and correspondingly about 90–10% by weight of macromonomer side chains.

7. The composition of claim 1 wherein the graft copolymer comprises about 20–80% by weight of polymeric backbone and correspondingly about 80–20% by weight of macromonomer side chains.

8. The composition of claim 1 wherein the graft copolymer has a weight average molecular weight of about 3,000–100,000.

9. The composition of claim 1 wherein the macromonomer side chains have a weight average molecular weight of about 1,000–30,000.

10. The composition of claim 1 wherein the anchoring groups are positioned on the backbone.

11. The composition of claim 1 wherein the anchoring groups are positioned on the side chains.

12. The composition of claim 1 wherein the monomers used to form the acetoacetate groups comprise at least about 1% by weight of the graft copolymer.

13. The composition of claim 1 wherein the graft copolymer further contains acyclic or cyclic amide groups on either or both the backbone or macromonomer as an additional anchoring group.

14. The composition of claim 1 wherein the graft copolymer further contains hydroxyl groups on either or both the backbone or macromonomer.

15. A composition suitable for use as a pigment dispersant, comprising a graft copolymer, wherein the graft copolymer has a weight average molecular weight of about 3,000–100,000 and comprises about 10–90% by weight of a polymeric backbone and about 90–10% by weight of macromonomer side chains grafted to the backbone wherein copolymer having functional acetocetate groups on the backbone, macromolecular side chains or both, and wherein
   (1) the polymeric backbone consists essentially of polymerized ethylenically unsaturated monomers and
   (2) the side chains are macromonomers that are grafted to the backbone at a single terminal point and consist essentially of polymerized ethylenically unsaturated monomers that are polymerized in the presence of a cobalt chain transfer agent and have a weight average molecular weight of about 1,000–30,000;
wherein the graft copolymer contains about 2 to 70% by weight, based on the weight of the graft copolymer, of polymerized ethylenically unsaturated monomers containing a functional acetoacetate group that are polymerized into the backbone, the side chains or both, wherein the acetoacetate groups of the copolymer are reacted with a compound bearing a primary amine group to produce an acetoacetyl amine pigment anchoring group on the graft copolymer.

16. The composition of claim 15 wherein said graft copolymer is formed from polymerized methacrylic and/or acrylic monomers.

17. The composition of claim 16 wherein said graft copolymer further contains up to 30% by weight, based on the total weight of the graft copolymer, of hydroxyl groups on either or both the backbone or macromonomer.

18. The composition of claim 16 wherein said graft copolymer further contains up to 20% by weight, based on the total weight of the graft copolymer, of acyclic or cyclic amide groups on either or both the backbone or macromonomer.

19. The composition of claim 16 wherein the pigment anchoring group contains tertiary amine functionality and is further quaternized to produce a quaternary ammonium group on the graft copolymer.

20. The composition of claim 15 wherein the anchoring group is positioned on the backbone.

21. The composition of claim 15 wherein the anchoring group is positioned on the macromonomer side chains.

22. A pigment dispersion comprising a pigment in an organic solvent dispersed by means of a composition of claim 1 or 15.

* * * * *